United States Patent [19]

Poppe et al.

[11] Patent Number: 4,617,342

[45] Date of Patent: Oct. 14, 1986

[54] CRYSTALLINE COPOLYAMIDE FROM TEREPHTHALIC ACID, ISOPHTHALIC ACID AND $C_6$ DIAMINES

[75] Inventors: Wassily Poppe, Lombard; Yu-Tsai Chen, Glen Ellyn; Edward E. Paschke, Wheaton, all of Ill.

[73] Assignee: Amoco Corporation, Chicago, Ill.

[21] Appl. No.: 735,072

[22] Filed: May 16, 1985

Related U.S. Application Data

[63] Continuation-in-part of Ser. No. 601,863, Apr. 19, 1984, abandoned, which is a continuation-in-part of Ser. No. 466,901, Feb. 16, 1982, abandoned.

[51] Int. Cl.[4] .................. C08G 69/26; C08L 77/06
[52] U.S. Cl. ..................................... 524/606; 524/607; 528/338; 528/339; 528/340; 528/347; 528/349
[58] Field of Search ................ 524/606, 607; 528/339, 528/338, 340, 347, 349

[56] References Cited

U.S. PATENT DOCUMENTS

| | | | |
|---|---|---|---|
| 3,475,387 | 10/1969 | Carter et al. | 528/339 |
| 3,627,736 | 12/1971 | Raum et al. | 528/339 |
| 3,926,924 | 12/1975 | Edgar et al. | 528/323 |
| 3,941,755 | 3/1976 | Chapman et al. | 528/339 |
| 4,022,756 | 5/1977 | Chapman et al. | 528/339 |
| 4,113,708 | 9/1978 | Chapman et al. | 528/313 |
| 4,238,603 | 12/1980 | Chapman et al. | 528/339 |

*Primary Examiner*—Harold D. Anderson
*Attorney, Agent, or Firm*—Stephen L. Hensley; William T. McClain; William H. Magidson

[57] ABSTRACT

A crystalline polyamide which has improved tensile strength and which has a heat deflection temperature in excess of 240° C. when filled is formed from dicarboxylic acid compounds comprising compounds of terephthalic acid and isophthalic acid in a molar ratio of at least 80:20 to about 99:1 and diamines comprising hexamethylene diamine and trimethylhexamethylene diamine in a molar ratio of about 98:2 to about 60:40.

8 Claims, No Drawings

CRYSTALLINE COPOLYAMIDE FROM TEREPHTHALIC ACID, ISOPHTHALIC ACID AND C₆ DIAMINES

BACKGROUND OF THE INVENTION

This is a continuation-in-part application of Ser. No. 601,863 filed Apr. 19, 1984, which was a continuation-in-part application of Ser. No. 466,901, filed Feb. 16, 1983, both now abandoned, both of which are incorporated herein by reference.

FIELD OF THE INVENTION

The field of this invention relates to crystalline polyamides obtained from compounds of terephthalic acid (TA) and isophthalic acid (IA) in combination with mixtures of hexamethylene diamine (HMDA) and trimethylhexamethylene diamine (TMHMDA) and filled compositions thereof.

BACKGROUND

Crystalline polyamides from mixtures of TA and IA and mixtures of TMHMDA and HMDA wherein the TA content is at least 80 percent of the total acid moieties have not been obtained by the prior art. In fact, U.S. Pat. No. 3,382,216 (1968) teaches that the preparation of polyhexamethylene terephthalamide cannot be effected through melt condensation processes.

U.S. Pat. No. 3,150,117 (1964) discloses that linear amorphous film forming polyamides can be prepared from dicarboxylic acids and alkyl-substituted saturated hydrocarbons; however, the mixture of trimethylhexamethylene diamine and hexamethylene diamine is not disclosed in this reference.

U.S. Pat. No. 3,294,758 (1966) discloses a polyamide which is prepared from terephthalic and isophthalic acid and a mixture of diamines consisting of 5-30 weight percent hexamethylene diamine and 95-70 weight percent trimethylhexamethylene diamines. This patent teaches that compositions having more than 30 weight percent hexamethylene diamine are brittle.

U.S. Pat. No. 4,410,661 (1983) discloses a polyamide obtained from (i) a mixture of 70-100 weight percent trimethylhexamethylene diamines and 30-0 weight percent hexamethylene diamine and (ii) 0-100 weight percent terephthalic acid and 100-0 weight percent isophthalic acid.

Crystalline polyphthalamides obtained from terephthalic acid mixtures of hexamethylene diamine and trimethylhexamethylene diamine have been disclosed in commonly owned U.S. Pat. No. 4,495,328, which issued from application Ser. No. 601,909, which was a continuation-in-part of application Ser. No. 466,903 filed Feb. 16, 1983 concurrently with application Ser. No. 466,901. This patent is incorporated herein by reference.

Other U.S. patents of interest include: U.S. Pat. Nos. 3,825,516 (1974); 3,962,400 (1976); 3,941,755 (1976); 3,627,736 (1971); and 3,692,749 (1972). All of these patents disclose amorphous polyamides.

In reviewing all these references, it is clear that the crystalline polyphthalamides manufactured from mixtures of TA and IA and mixtures of HMDA and TMHMDA wherein the TA content is at least 80 percent of the acid moieties, which polymers have improved tensile strength, are unknown to the prior art. Additionally, such polyamides which, when filled, have heat deflection temperatures of about 240° C. to about 305° C. are unknown in the prior art.

STATEMENT OF THE INVENTION

The general object of this invention is to provide a crystalline polyamide with improved tensile strength. Another object is to provide reinforced molding compositions which have heat deflection temperatures of at least about 240° C. and good tensile strengths.

We have now found that these objects can be accomplished with a crystalline polyamide prepared from dicarboxylic acid compounds and diamines wherein said dicarboxylic acid compounds comprise compounds of terephthalic acid (TA) and isophthalic acid (IA) in a molar ratio TA to IA of at least 80:20 to about 99:1 and said diamines comprise hexamethylene diamine (HMDA) and trimethylhexamethylene diamine (TMHMDA) in a molar ratio HMDA to TMHMDA of about 98:2 to about 60:40. These objects are also accomplished by a blend which comprises (1) about 80 to about 50 parts by weight of a polyamide resin of terephthalic acid (TA) and isophthalic acid (IA) and diamine wherein the molar ratio of TA to IA is at least 80:20 to about 95:5 and wherein said diamine comprises hexamethylene diamine (HMDA) and trimethylhexamethylene diamine (TMHMDA) in a molar ratio HMDA:TMHMDA of about 98:2 to about 60:40, and (2) about 20 to about 50 parts by weight of a filler selected from the group consisting of glass fibers, graphite fibers, and mixtures thereof.

This crystalline polymer has improved tensile strength and, when filled, a heat deflection temperature in the range of at least about 240° C. to about 305° C., as determined by ASTM method, D648. The high heat deflection temperature is an unusual feature and completely unexpected, since amorphous polyphthalamides have much lower heat deflection temperatures. It is important to have high heat deflection temperatures since it enables the injection molded polyphthalamides to be used in applications such as the hood of an automobile, shroud for a lawn mower, chain saw guard, and an electrical connector application. In addition to the high heat deflection temperature, the tensile strengths of this filled polyamide are about 15,000 to about 40,000 psi, which is as high or higher than that of die cast aluminum or zinc, while the specific gravity is about one-half that of aluminum or zinc. Thus, this polyamide is particularly useful for application in transportation equipment. The molecular weight of the polyamide is about 5,000 to about 40,000.

It is well known from the prior art that poly(hexamethylene phthalamide) materials with a high terephthalic acid content are difficult to produce due to the high melting temperature of the polymers. In fact, the prior art teaches that poly(hexamethylene phthalamide), for which the terephthalic acid content is greater than 80 mole percent, cannot be produced via melt polymerization. Chapman, et al., U.S. Pat. No. 4,022,756 (1977), discuss this problem with respect to the formation of fibers from polymers containing greater than 80 mole percent terephthalic acid, but similar problems result with injection molding compounds in this range of TA content. Consequently, the prior art teaches that the polyamide of the instant invention would not be expected to be useful.

The polyamide of this invention is preferably filled with about 10 to about 60 weight percent glass fibers, graphite fibers or a mixture thereof. Other fillers such as glass beads and minerals can be used; however, the high heat deflection temperature may not be obtained. Advantageously, the molding composition may contain from about 20 to about 50 weight percent of glass fibers, graphite fibers or a mixture thereof. Our studies have shown that high heat deflection temperatures of the molded polyamide can be improved by using such fillers. The polyamide resin costs are also reduced when these fillers are substituted for part of the polyamide resin.

Fibers can be prepared from this polyamide although the preferred use is as a molding resin.

It is also possible to add to the polyamides of this invention various additives such as heat stabilizers, UV stabilizers, other particulate and fibrous reinforcing agents, toughening agents, flame retardants, plasticizers, antioxidants, and pigments before, during, or after the polymerization.

Two critical properties of an injection molding composition are strength, especially tensile strength, and heat resistance, as measured, for example, by the heat deflection temperature of the material. These problems which are inherent in the polyamides of high terephthalic acid content prepared with only hexamethylene diamine are reflected in the data presented in Table 1.

TABLE 1

| TA/IA-HMDA molar ratio | 50/50–100 | 65/35–100 | 68/32–100 | 72/28–100 |
|---|---|---|---|---|
| Tensile strength, psi | 9,600 | 15,400 | 14,900 | 7,500 |
| Elongation at break, % | 152 | 5 | 14 | 2 |
| HDT @ 264 psi, °F. | 154 | 253 | 269 | 267 |
| Crystallinity | No | Yes | Yes | Yes |

The 50/50-100 TA/IA-HMDA composition is essentially amorphous. In terms of the tensile properties, this composition could be characterized as tough; yet, because of the low heat deflection temperature, the material would soften in hot water. The two intermediate materials, TA/IA-HMDA of 65/35-100 and 68/32-100, could be characterized as strong. The presence of crystallinity, however, increases the heat deflection temperature by about 100° F. As used herein, a "crystalline" polymer is defined to be a polymer having a measurable, well-defined melting temperature. Above a terephthalic acid level of 70 mole percent, the tensile strength declines precipitously, and the material becomes very brittle. The heat deflection temperature is not further improved by increasing the level of TA. Also, as the level of TA is increased about 70 mole percent, it becomes more difficult, if not impossible, to prepare the polymer by usual melt polymerization methods.

Quite surprisingly, it is possible to extend the limits of melt preparation for the poly(hexamethylene phthalamide) by incorporating a second hexamethylene diamine into the composition. Addition of the second diamine also improves the tensile strength and the filled heat distortion temperature of the high TA polyamide. This second hexamethylene diamine is trimethylhexamethylene diamine (TMHMDA) which is actually a mixture of 2,2,4-trimethylhexamethylene diamine and 2,4,4-trimethylhexamethylene diamine. The effectiveness of the TMHMDA is illustrated in Table 2.

TABLE 2

| TA/IA-HMDA/TMHMDA molar ratio | 65/35–100/0 | 72/28–100/0 | 85/15–96/4 | 100/0–65/35 |
|---|---|---|---|---|
| Tensile strength, psi | 15,400 | 7,500 | 14,600 | 13,700 |
| Elongation at break, % | 5 | 2 | 5 | 6 |
| HDT @ 264 psi, °F. | 253 | 267 | 273 | 273 |

The tensile properties of the 85/15-96/4 TA/IA-HMDA/TMHMDA formulation are virtually identical to those of the 65/35-100 TA/IA-HMDA formulation, while a 20° F. improvement in heat deflection temperature (HDT) is also noted.

The properties of these TMHMDA-containing compositions are further, dramatically improved by the incorporation of glass fibers as set forth in Table 3.

TABLE 3

| TA/IA-HMDA/TMHMDA molar ratio | 65/35–100/0 | 85/15–96/4 | 85/15–96/4 | 100/0–100/0 |
|---|---|---|---|---|
| Glass fiber, % | 33 | 30 | 45 | 45 |
| Tensile strength, psi | 31,100 | 17,200 | 36,300 | 8,300 |
| Elongation at break, % | 5 | 3 | 5 | 1 |
| HDT @ 264 psi, °F. (°C.) | 270 (132) | Not Run | >580 (304) | >580 (304) |

The injection moldable crystalline polyamide compounds of TA and IA of this invention comprise the following recurring structural units:

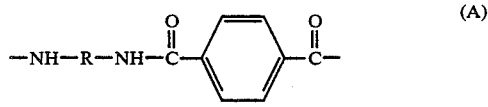 (A)

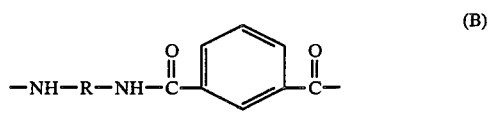 (B)

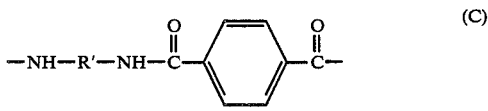 (C)

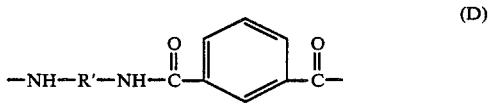 (D)

wherein R is a straight chain aliphatic hydrocarbon radical containing 6 carbon atoms and R' is an alkyl-substituted aliphatic hydrocarbon chain, 6 carbon atoms in length, in which the alkyl substitution comprises three methyl groups, with two of the three methyl groups on the same carbon atom. The preferred diamines for these compositions are 2,2,4-trimethylhexamethylene diamine, 2,4,4-trimethylhexamethylene diamine or mixtures of these.

The dicarboxylic acid compounds useful in preparing the polyamides of the instant invention are terephthalic acid (TA) and isophthalic acid (IA) and their derivatives which are capable of being reacted with diamines to form the instant polyamide. Useful derivatives include the corresponding acid halides, particularly terephthaloyl chloride and isophthaloyl chloride, and corresponding alkyl and aryl esters wherein preferably the alcohol component has at least two carbons, for example, ethyl terephthalate and phenyl terephthalate. The molar ratio of the TA and IA moieties can vary from at least 80:20 to about 99:1. Preferably, the molar ratio ranges from about 85:15 to about 95:5. Most preferably, the molar ratio is from about 85:15 to about 90:10. It has been found that in order to obtain the heat deflection temperature in excess of 240° C. and have high tensile strength, the content of the TA moiety must comprise at least 80 mole percent of the total TA and IA content.

The diamines useful in preparing the instant polyamide are hexamethylene diamine (HMDA) and trimethylhexamethylene diamine (TMHMDA). The molar ratio of HMDA and TMHMDA can vary from about 55:45 to about 98:2, preferably from about 60:40 to about 95:5. As stated herein above, the preferred TMHMDA is a mixture of 2,2,4-trimethylhexamethylene diamine and 2,4,4-trimethylhexamethylene diamine. The amount of TMHMDA required relative to the HMDA increases as the level of TA is increased in order to allow melt processing of the polymer.

Injection molding of this polyphthalamide, filled or unfilled, is accomplished by injecting the polyamide melt into a mold maintained at a temperature of about 100° to about 220° C. In this process, a 20-second to 1-minute cycle is used with a barrel temperature of about 300° to 350° C. These temperatures will vary depending on the glass transition temperature (Tg) and melting temperature (Tm) of the polyamide being molded. The polyphthalamide has excellent thermal and mechanical properties and can readily be molded into useful products or formed into fibers, laminates or coatings.

The addition of reinforcing materials improves the material properties of the resulting blend. Particularly, the physical properties, such as flexural strength, are improved if the polyamides contain from about 10 to about 60 percent by weight glass fibers, glass beads, minerals, or mixtures thereof. In the preferred range, the polyamides contain about 20 to about 50 percent by weight of glass fibers, glass beads, or graphite, or mixtures thereof. Suitably, the reinforcing materials can be glass fibers, glass beads, glass spheres, or glass fabrics. The preferred fillers are glass fibers and graphite fibers. The glass fibers are made of alkali-free, boron-silicate glass or alkali-containing C-glass. The thickness of the fibers is, on the average, between 3 microns and 30 microns. It is possible to use long fibers in the range of from 5 mm to 50 mm and also short fibers with each filament length of 0.05 mm to 5 mm. In principle, any standard commercial grade fiber, especially glass fibers, can be used. Glass beads ranging from 5 microns to 50 microns in diameter can also be used as a reinforcing material in combination with glass fibers.

The glass fiber-reinforced polyamide polymers can be prepared by any conventional method. Suitably, so-called roving endless glass fiber strands are coated with the polyamide melt and subsequently granulated. The cut fibers and glass beads can also be combined with granulated polyamide compositions and the resulting mixture melted in a conventional extruder. Alternatively, uncoated fibers can be introduced into the molten polyamides through a suitable inlet in the extruder.

The following procedures and examples illustrate a preferred embodiment of this invention. It is understood that these procedures and examples are illustrative only and do not purport to be wholly definitive with respect to the conditions or scope of the invention. While the desired polymer properties can be obtained regardless of the method of preparation, provided an adequate molecular weight is attained, the continuous process outlined in Example 4 represents a practical process for the commercial production of polyamides with high terephthalic acid content. The presence of high levels of terephthalic acid renders these polymers high melting and highly viscous. Chapman, et al., U.S. Pat. No. 4,022,756, describe the extraordinary means which must be employed in order to obtain acceptable polymer with terephthalic acid contents of 60 to 80 mole percent in conventional polycondensation polymerization equipment.

The components used in the polymerization mixtures described below were polymerization-grade materials including: Amoco Chemicals Corporation grade TA-33 terephthalic acid and grade IPA-99 isophthalic acid; Monsanto Corporation aqueous hexamethylene diamine solution which is typically about 70 weight percent HMDA in water; TMHMDA was technical grade from Axon Company; benzoic acid (USP); and deionized water. The glass fibers used were ⅛-inch long with a diameter of about 9.7 micrometers and were supplied by Pittsburgh Plate Glass, grades PPG 3531 and PPG 3540, or similar materials.

Procedure for Preparation of Polyamide

While batch production of these polyamides can be carried out in one or two steps, it is convenient to carry out the process in two steps. In the first step, a polyamide of intermediate conversion is prepared in a stirred reactor which can process materials of high viscosity. For this process, feed materials consisting of the diacids (TA and IA in the desired ratios), the diamines (HMDA and TMHMDA in the desired ratios), and any additives are charged to the reactor at about room temperature to about 175° F. Water, sufficient to attain a homogeneous solution before pressure letdown begins, is also added. For the equipment described in the examples which follow, the water content is about 15 percent of weight. The temperature of this polymerization mixture is then raised to between about 500° F. and 600° F. as rapidly as possible. Pressure, principally steam pressure, is allowed to build to the pressure limits of said reactor (in this case, 130 psig). Once the target temperature is reached, the pressure is reduced to atmospheric pressure over a period of 5 to 120 minutes. The polymer is then allowed to flow out of the reactor by gravity or is pumped out and collected under an inert atmosphere. This polymer has an inherent viscosity (TCE/phenol) of about 0.10 dl/g to about 1.0 dl/g or greater. Preferably, the inherent viscosity is about 0.10 dl/g to about 0.40 dl/g. This polyamide of intermediate conversion is then granulated and fed to the final polycondensation section. This final polycondensation section is described below. Alternatively, if the inherent viscosity of this batch-prepared polymer exceeds about 0.8 dl/g, it can be compounded directly with the reinforcing filler materials.

When these polyamides are prepared by the above-described process, and the resultant inherent viscosity is less than about 0.8 dl/g, the polyamide must be finished to an inherent viscosity of about 0.8 dl/g or greater in order to fully realize the improved properties of the instant polyamides. This finishing process is the final polycondensation step and utilizes a twin-screw extruder reactor such as a Werner-Pfleiderer ZSK-30. The twin-screw extruder allows these stiff, high melting resins to be easily handled. The screw configuration employed when the twin-screw extruder is used as a polycondensation reactor consists of four basic sections. The first section is a feed section which is composed of relatively long pitches for conveying the polymerization mixture away from the feeding port. The second section is a short compression section which compresses the polymerization mixture and provides a melt seal for the reaction zone. The reaction zone comprises about 70–80 percent of the entire length of the extruder. Typically, the screw flights have relatively long pitches, but various mixing elements or kneading blocks can be included in this section. The final section is also a compression section which feeds the die. Other types of finishing reactors such as disk ring reactors, agitated stranding devolatilizers, and thin film evaporators can be utilized; however, some of these can have difficulty in handling the high viscosity of our resins.

Procedure for Compounding the Polyamide

Two techniques are employed to prepare compounded samples for injection molding. The first of these is dry blending, which is especially convenient for the preparation of small samples. Dry blending involves combining weighed amounts of the resin, filler, and any other additives. These ingredients are then mixed by tumbling, stirring, etc., until the mixture is homogeneous. This dry blend can be either injection molded directly or used as a feed for melt compounding.

Melt compounding involves melting the polymer resin in the presence of the filler or adding filler to the polymeric melt. This is conveniently accomplished in a twin-screw extruder, such as the above-mentioned ZSK-30. The basic screw configuration used for melt compounding is composed of three sections. The first section, the feed section, has screw flights of relatively long pitches for conveying the material away from the feeding port. The second section is a compression section in which the screw flights have shorter pitches. In this section, the resin is melted and further mixed with the filler. The third section is a decompression section in which the longer pitches are again used to degas the polymer melt. Advantageously, this section is vented. The polymer melt passes through a die to strand the compounded resin which is then chopped into pellets. The specific conditions employed in melt compounding, the compositions of the instant invention, and the comparative examples are presented in Table 4 below.

TABLE 4

| ZSK-30 Conditions | | | | | | |
|---|---|---|---|---|---|---|
| Screw | | | | | | |
| Speed, Rpm | Torque, Percent | Zone Temperature, °F. | | | | |
| | | 1 | 2 | 3 | 4 | 5 |
| 125 | 28 | 620 | 620 | 620 | 565 | 550 |

| Temperature, °F. | | Product Rate, |
|---|---|---|
| Final | | |
| Die | Melt | lb/hr |
| 550 | 556 | 9.0 |

Procedure for Forming of Objects from the Glass-Filled Compositions

The compositions of the instant invention are melt processable. Injection molding is a common technique for forming polymeric materials into useful shapes and objects. The heat distortion temperature specimens used to exemplify this invention were prepared in a 1.5 oz Arburg injection molding machine, Model 221E, in accordance with ASTM procedures.

Injection molding is an art. The precise conditions employed depend not only on the molding machine being used and the part being formed, but also on the melt viscosity of the polymeric resin and the level and nature of the fillers used. A thorough procedure for establishing an injection molding cycle is described in *Nylon Plastics* by Melvin I. Kohan in Chapter 5, "Injection Molding of Nylons," pp. 156–205, John Wiley & Sons, Publishers (1973), incorporated herein by referece. General conditions for injection molding of ASTM specimens on the Arburg Model 221E injection molding machine are presented in Table 5 below.

TABLE 5

| | |
|---|---|
| Mold Temperature | 100° to 200° C. |
| Injection Pressure | 6,000 to 15,000 psi and held for 10 to 20 seconds |
| Back Pressure | 100 to 1,000 psi |
| Cycle Time | 20 to 60 seconds |
| Extruder Nozzle Temperature Barrel | 320° to 340° C. |
| Heated to | 270° to 370° C. |
| Screw | 20 to 60 revolutions/minute |

The temperature of the mold was controlled. This mold temperature is cited in each example. The aforementioned procedures were employed not only for the examples which embody the present invention, but they were also employed in the preparation of comparative examples from the prior art. The examples also demonstrate that the unexpected increase in heat deflection temperature upon filling is a property of the polymer and not of the method of preparation.

The invention is explained in greater detail in the examples set forth below.

EXAMPLE 1

Preparation of 85/15-94/6 (TA/IA-HMDA/TMHMDA) Polyamide

In this example, the polyamide was produced by the continuous process described in Example 4. The 5-gallon salt reactor was charged with the following reactants:

| Reactant | Amount, g |
|---|---|
| TA | 8742.6 |
| IA | 1495.2 |
| HMDA | 6763.2 |
| TMHMDA | 570.0 |
| $NaH_2PO_2.H_2O$ | 13.8 |
| Silicone oil | 13.8 |
| $H_2O$ | 3185.4 |

Once the salt reactor was charged, it was purged with nitrogen and heated to about 470° F. The pressure set point was 450 psig, and this was attained by a combination of steam pressure and nitrogen gas pressure. After about 85 minutes, the salt solution was then continuously passed through the reactor system. In the preheat zone, the pressure was increased to about 1500 to 2000 psig and the melt temperature was 660° F. The flash reactor was maintained at about 40 psig. The temperatures within the flash reactor ranged from 580° to 650° F. depending upon the location within the flash reactor. The effluent from the flash reactor was injected directly into the twin-screw extruder/reactor. The operating conditions of the twin-screw extruder/reactor are shown in the following table.

| ZSK-30 Conditions | | | | | | |
|---|---|---|---|---|---|---|
| Screw | | | | | | |
| Speed, Rpm | Torque, Percent | Zone Temperature, °F. | | | | |
| | | 1 | 2 | 3 | 4 | 5 |
| 150 | 40–60 | 635 | 560 | 570 | 570 | 560 |

| Temperature, °F. Final | | Product Rate, | Product |
|---|---|---|---|
| Die | Melt | lb/hr | IV |
| 560 | — | 11 | 1.25 |

The total production of this run was 26 lbs. The inherent viscosity of the resin measured in the solvent of 60/40 phenol/tetrachloroethane mixture at 30° C. was 1.25 dl/g.

EXAMPLE 2

Heat Stabilized Polyamide

About 10 lbs of the 85/15-94/6 TA/IA-HMDA/TMHMDA polyamide produced by the continuous process was dried in a forced-air oven at 230° F. overnight and then dry blended with 0.31% cupric acetate and 0.295% potassium iodide in a tumbler mixer for about 20 minutes. The well-mixed resin was then fed into the ZSK-30 extruder for extrusion compounding. The operating conditions of the extruder are shown in the following table:

| ZSK-30 Conditions | | | | | | |
|---|---|---|---|---|---|---|
| Screw | | | | | | |
| Speed, Rpm | Torque, Percent | Zone Temperature, °F. | | | | |
| | | 1 | 2 | 3 | 4 | 5 |
| 200 | 15–20 | 615 | 615 | 645 | 615 | 620 |

| Temperature, °F. Final | | Product Rate, |
|---|---|---|
| Die | Melt | lb/hr |
| 610 | — | 12 |

EXAMPLE 3

We have prepared monofilaments using our novel polyamides. To produce monofilament, the process starts with a single-screw extruder to supply a melt for conversion to fiber. The die for monofilament is similar to the multifilament die. The monofilament process is a slower operation, typically about 50 to about 200 feet/minute. For the melt spinning operations, about 40 to about 80 feet/minute was the speed used for the monofilament processing. The monofilament, on the other hand, is water-quenched with much less melt drawdown. The monofilament is subsequently drawn with heated drawing systems. The monofilament drawing is done inline using heated ovens.

TABLE 6

| | | Monofilament from 85/15-75/25 (TA/IA-HMDA/TMHMDA) | | | | |
|---|---|---|---|---|---|---|
| Tm (°C.) | Melt Temp. (°C.) | Denier (g/9000 m) | Elongation (%) | Tenacity (g/d) | Initial Modulus (g/d) | Draw Ratio (X:1.0) |
| 302 | 321 | 1360 | 11.7 | 5.0 | 61.8 | 4.2 |
| | | 1630 | 9.6 | 4.7 | 59.1 | 4.6 |
| | | 1850 | 17.0 | 4.4 | 53.0 | 5.1 |
| | | 1820 | 29.3 | 3.3 | 45.1 | 3.1 |

EXAMPLE 4

Continuous Preparation of 65/35-100 (TA/IA-HMDA) Copolymer

The following charge was placed in the salt reactor:

| Component | Amount, g |
|---|---|
| TA | 6447.1 |
| IA | 3471.5 |
| BA (benzoic acid) | 73.3 |
| HMDA | 7112.1 |
| H$_2$O | 3100 |
| NaH$_2$PO$_2$.H$_2$O | 13.8 |

The salt reactor consisted of a 5-gallon stirred tank reactor with internal coils, an oil jacket for temperature control, and a pitched-blade turbine with a variable-speed drive. This reactor can accommodate a 60 g-mole charge of the polyammonium carboxylate salt components.

Once the salt reactor has been charged, it is purged with nitrogen or other inert gas and heated to 420° F. (216° C.). The pressure is set to 480 psig by first allowing the water in the salt to reach its equilibrium pressure and then adjusting with nitrogen. In the feed batch operations, the salt is subjected to a range of residence times. They average about 100 minutes. Also, as a result of the fed-batch mode of operation, it is necessary to include a second surge vessel in the salt preparation section. This vessel, which is at 420° F. (216° C.) and 450 psig, is used to isolate the salt reactor during charge addition.

Upon leaving the salt section, the salt is passed through a 140-micron filter into a two-headed positive displacement Bran-Lubbe pump. Temperature through the pump is maintained at 406° F. (208° C.). Pressures are increased to 1800 psig in the pump. After passing through the pump, the salt solution was passed through a preheat zone and heated to 622° F. (328° C.). The pressure prevents vapor formation in the preheater. Residence time in the preheater is 40 seconds.

The salt enters the flash reactor through a valve manufactured by Research Control Valve (RCV) where pressure is reduced from about 1800 psig to about 0 to 400 psig. In ordinary operation, this flash reactor is a tubular reactor about 10 to 14 feet long with an internal diameter of 0.375 to 0.5 inches. The wall temperature of this reactor is maintained at about 700° to 750° F. The necessary heat is supplied by hot oil jacket, electrical heaters, or other means. The internal temperature of this reactor is monitored along its length. The temperature of the reaction mixture is between about 525° F. and 630° F. within this reactor. The pressure within the flash reactor is controlled by a second RCV. The residence time in the flash reactor is about 10 seconds. The process conditions were:

| Process Conditions | | | | | | | |
|---|---|---|---|---|---|---|---|
| Preheat Reactor | | | | | | | |
| Temp, °F. | Press., psig | Feed Rate, gal/hour | Press., psig | Reactor Temperature, °F. | | | |
| | | | | 1/4 | 1/2 | 3/4 | Final |
| 640 | 1850 | 1.8 | 50 | 541 | 556 | 576 | 592 |

Upon exiting the flash reactor, the reaction mixture is injected directly onto the screws of a twin-screw extruder/reactor, the Werner-Pfleiderer ZSK-30, described above. The twin-screw extruder increases the molecular weight of the polymer, to provide an inherent viscosity of the finished polymer of about 0.8 dl/g or greater. The process conditions employed in the twin-screw reactor are presented below.

| ZSK-30 Conditions | | | | | | |
|---|---|---|---|---|---|---|
| Screw | | Zone Temperature, °F. | | | | |
| Speed, Rpm | Torque, Percent | 1 | 2 | 3 | 4 | 5 |
| 125 | 28 | 620 | 620 | 620 | 565 | 550 |

| Temperature, °F. Final | | Product Rate, lb/hr |
|---|---|---|
| Die | Melt | |
| 550 | 556 | 9.0 |

The resin produced above had an inherent viscosity of 0.85 dl/g. This resin was compounded with 33 weight percent glass fiber by first dry blending the ingredients and then melt compounding the resins on the ZSK-30 twin-screw extruder/reactor. The processing conditions employed were:

| Compounding Conditions, ZSK-30 | | | | | | | | |
|---|---|---|---|---|---|---|---|---|
| Screw | | Zone Temperature, °F. | | | | | Die Temp, °F. | Product Rate, lb/hr |
| Speed | Torque | 1 | 2 | 3 | 4 | 5 | | |
| 90 | 41 | 535 | 600 | 600 | 600 | 600 | 600 | 17 |

The filled and neat resins were injection molded. The following material properties were obtained:

| Glass Fiber % | Ultimate Tensile Strength, psi | Elongation at break, % | Flexural Strength psi | Modulus, M psi | Izod Impact ft-lb/in | HDT @ 264 psi, °F. |
|---|---|---|---|---|---|---|
| 0 | 15,400 | 5.0 | 22,800 | 444 | 0.8 | 241 |
| 33 | 31,100 | 4.5 | 42,300 | 1,360 | 1.9 | 270 |

EXAMPLE 5

Preparation of 68/32-100 (TA/IA-HMDA)

This polymer was prepared by the process described in Example 4 except that the charge to the reactor consisted of the following ingredients:

| Component | Amount, g |
|---|---|
| TA | 5084 |
| IA | 2392 |
| HMDA | 6329 |
| H$_2$O | 2272 |
| NaH$_2$PO$_2$·H$_2$O | 12 |

| Component | Amount, g |
|---|---|
| Silicone oil (DC-200) | 12 |

The resin had the following material properties:

| Tensile Properties | | | |
|---|---|---|---|
| Yield Tensile Strength, psi | Elongation, % | Ultimate Tensile Strength, psi | Elongation at Break, % |
| 17,400 | 7.9 | 14,900 | 14 |

| Flexural Properties | | Izod | HDT |
|---|---|---|---|
| Strength, psi | Modulus, M psi | Impact, ft-lb/in | @ 264 psi, °F. |
| 24,600 | 459 | 1.8 | 269 |

EXAMPLE 6

Preparation of 72/28-100 (TA/IA-HMDA)

The polyamide of 72/28-100 TA/IA-HMDA composition was produced by the batch melt process on the 4CV Helicone reactor. The reactants, 358.84 g TA, 139.55 g IA, 479.9 g HMDA including 25.9% water as received, 89 g deionized water, and 0.5 g sodium hypophosphite as catalyst, were loaded into the 4CV Helicone reactor, which was preheated to 190°-210° F. The temperature controller was set at 600° F. The agitator was set at about 10 rpm. After about 26 minutes, the pressure in the reactor rose to about 120 psi. The pressure was held at 120 psi for about 15 minutes as the melt temperature rose to about 506° F. The pressure was then vented down to 100 psi in 3 minutes and held at 100 psi for about 10 minutes. At this point, the temperature controller was set at 610° F. The pressure was held at 100 psi for an additional 7 minutes and then was vented down to atmospheric pressure in about 2 minutes. At this moment, the melt temperature rose to about 609° F. and the current for the agitator started to increase. The polymer was then dumped into water. The inherent viscosity of the polymer measured in the solvent of 60/40 phenol/tetrachloroethane mixture at 30° C. was 0.91 dl/g.

The polyamide resin produced by the batch melt process was ground and dried at 230° F. in a pump vacuum oven overnight. One part was kept as neat resin. The other part was dry blended with 30% PPG 3540 glass fibers. The samples were injection molded into test bars on the Arburg molding machine by using a mold temperature of 250° F. and barrel temperature profile of 580°, 610°, and 610° F. Type I tensile bars were molded and tested at 2 in/min testing speed. The test results are shown in the table below:

| Glass Fiber % | Ultimate Tensile Strength psi | Elongation at break, % | Flexural Strength psi | Modulus, M psi | Izod Impact ft-lb/in | HDT @ 264 psi, °F. |
|---|---|---|---|---|---|---|
| 0 | 7,500 | 2 | 20,400 | 521 | 1.1 | 267 |
| 30 | 29,300 | 4 | 43,900 | 1,370 | 2.7 | >560 |

EXAMPLE 7

Preparation of 75/25-100 (TA/IA-HMDA) Polyamide

In this example, a series of a salt reactor, standpipe, and polycondensation reactor were employed to obtain a polycondensate with an inherent viscosity of about 0.1 to 0.2 dl/g. This polycondensate of low inherent viscosity was called a prepolymer. The high melt viscosity and high melt temperature of these polymers limited the inherent viscosity which could be obtained in the series of reactors. This low inherent viscosity material was then finished to a polymer of 0.85 dl/g inherent viscosity in the ZSK-30 extruder reactor.

In this semi-continuous process, the reactants, 4984 g TA, 1661.2 g IA, 6540.8 g HMDA including 26.8% water as received, 800 g deionized water, 9.16 g $NaH_2PO_2 \cdot H_2O$ and 9.16 g silicone oil, were charged to a 5-gallon salt reactor. The salt reactor was operated at 445 psig and 445° F. (melt temperature). The effluent from this reactor was then passed to a standpipe which was operated at 420 psig and 470° F. (heating oil temperature). The residence time in the polycondensation reactor was about 30 minutes. At the end of this time, the reactor was vented down to atmospheric pressure and the prepolymer was removed from the reactor.

The prepolymer was dried in a forced-air oven at 80° C. overnight and then ground to about a 3 mm size. The inherent viscosity was determined to be 0.11 dl/g, indicating the prepolymer was good enough for the feed of ZSK-30 extruder/reactor. The dried prepolymer was fed to the ZSK-30 twin-screw extruder/reactor. The extruder/reactor was operated at atmospheric pressure. The operating conditions are shown below. The residence time in the extruder was about 2 minutes. The inherent viscosity of the product was 0.85 dl/g.

| ZSK-30 Conditions | | | | | | |
|---|---|---|---|---|---|---|
| Screw Speed, Rpm | Torque Percent | \multicolumn{5}{c}{Zone Temperature, °F.} |
| | | 1 | 2 | 3 | 4 | 5 |
| 75 | 45–55 | 90 | 510 | 700 | 708 | 615 |
| \multicolumn{2}{c}{Temperature, °F. Final} | | | \multicolumn{3}{c}{Product Rate,} |
| Die | | Melt | | \multicolumn{3}{c}{lb/hr} |
| 610 | | — | | \multicolumn{3}{c}{~8} |

EXAMPLE 8

In all the examples, the reactants, 1.317 lbs TA, 0.614 lbs HMDA, 0.462 lbs TMHMDA, and 0.87 gm of sodium hypophosphite, are loaded into a Helicone reactor that has been heated to 95°–150° C. The temperature control is set at 215° C. The agitator is set at the maximum, 36 rpm. In the examples given in Table 2, the reactor pressure rose to 105 psi. The melt temperature was 205° C. The temperature controller settings were gradually increased to 230° C. The reactor pressure rose to 123 psi; the melt temperature was 220° C. The temperature control was then increased to 315° C. The reactor pressure was controlled at 123–125 psi for 16 minutes as the melt temperature increased to 260° C. The reactor pressure was then vented down to 100 psi over a 17-minute period. The melt temperature increased to about 310° C. The reactor was then vented to atmospheric pressure over a 2-minute period. The melt temperature reached 313° C. The reaction was then stopped by dumping the resin into water. The resin had an I.V. of 0.86 dl/g, measured in 60/40 phenol/tetrachloroethane at a temperature of 30° C. The filled molding compositions of this invention are prepared by blending the fillers and polymer and then extrusion compounding on an extruder. The extrusion compounding is carried out with the polymer in the molten state, generally at a temperature ranging from about 288° to 355° C., and preferably from about 310° to 343° C.

Injection molding techniques which are used according to this invention are known to persons of skill in the art and are commonly referred to as "reciprocating screw injection molding." In reciprocating screw injection molding, powdered or pelletized polymer is delivered to a hopper and from there fed into the feed port of a barrel, typically cylindrical, which houses a screw adapted for rotation and reciprocal motion within the barrel along the length thereof.

The barrel also has a nozzle end opposite the feed end, and may have a chamber located near the nozzle end. Polymer fed from the hopper into the barrel passes into and through the area between flights of the rotating screw and, during such passage, is plasticated due to heat and the working of the polymer between the interior surface of the barrel and the surfaces between screw flights. Working of the polymer between screw flights and the interior of the barrel compacts the polymer between screw flights. After passing between the screw flights, the compacted, plasticated polymer accumulates in the barrel or in a chamber near the nozzle.

During rotation of the screw, pressure, commonly referred to as "back pressure", is applied to the end of the screw at the feed end of the barrel. An opposing pressure develops due to accumulation of polymer at the nozzle end of the barrel, and when this pressure exceeds the back pressure, the screw is pushed away from the nozzle. When the accumulating polymer fills the chamber or the portion of the barrel vacated by the screw or, in some instances, when the screw reaches a predetermined position, pressure, commonly referred to an "injection pressure", is applied to the screw and the accumulated polymer is forced through the nozzle into a mold, which is commonly heated. In some cases, a booster is used to aid the injection. Typically, a non-return check valve is employed to prevent polymer from flowing back towards the screw. Following injection of the polymer into the mold, the polymer is held therein, the mold is cooled, and the molded part removed.

EXAMPLE 9

The polymer of Example 9 is prepared by dry blending 45 percent by weight of glass fibers with the polyamide prepared in Example 8.

EXAMPLE 10

The polymer of Example 10 is prepared by dry blending 55 percent by weight of glass fibers with the polyamide prepared in Example 8.

| Material Properties of 100/65/35 TA/HMDA/TMHMDA Polyamide Prepared as Shown in Example 8 | | | |
|---|---|---|---|
| | Glass | \multicolumn{2}{c}{Tensile ASTM Method D-638} |
| Example Number | Fiber, % | Strength, M psi | Elongation, % |

Material Properties of 100/65/35 TA/HMDA/TMHMDA Polyamide Prepared as Shown in Example 8

| Example Number | | | |
|---|---|---|---|
| 8 | 0 | 13.1 | 5.2 |
| 9 | 45 | 33.6 | 5.3 |
| 10 | 55 | 34.2 | 4.9 |

| Example Number | Flexural ASTM D-638 | | Notched Izod ASTM D-256, ft-lb/in |
|---|---|---|---|
| | Strength, M psi | Modulus, MM psi | |
| 8 | 21.3 | 0.46 | 0.77 |
| 9 | 49.5 | 1.82 | 3.17 |
| 10 | 52.4 | 2.32 | 3.88 |

| Example Number | Tensile Impact ASTM D-256, ft-lb/in² | HDT ASTM D-668 (at 264 psi), °C. | % Water Absorption ASTM D-570 |
|---|---|---|---|
| 8 | 37 | 103 | 0.55 |
| 9 | 33 | 303 | 0.23 |
| 10 | 88 | >304 | 0.20 |

Comparative examples 8, 9, and 10 show that in order to maintain tensile strength at high levels of TA, it is necessary to use higher levels of TMHMDA.

We claim:

1. A crystalline polyamide resin having improved tensile strength formed from dicarboxylic acid compounds and diamines wherein said dicarboxylic acid compounds comprise compounds of terephthalic acid (TA) and isophthalic acid (IA) in a molar ratio TA:IA of at least 80:20 to about 99:1 and wherein said diamines comprise hexamethylene diamine (HMDA) and trimethylhexamethylene diamine (TMHMDA) in a molar ratio HMDA:TMHMDA of about 98:2 to about 60:40.

2. The polyamide resin of claim 1 wherein said TA:IA molar ratio is about 75:25 to 90:10 and said HMDA:TMHMDA molar ratio is about 65:35 to 95:5.

3. The polyamide resin of claim 1 wherein said dicarboxylic acid compounds are terephthalic acid and isophthalic acid.

4. The polyamide resin of claim 1 in combination with about 10 to about 60 weight percent of a filler selected from the group consisting of glass fibers, glass beads, minerals, graphite fibers, or mixtures thereof.

5. A molded article comprising the polyamide resin of claim 1.

6. A blend having a heat deflection temperature of at least 240° C., said blend comprising (1) about 80 to about 50 parts by weight of a polyamide resin of terephthalic acid (TA) and isophthalic acid (IA) and diamines wherein the molar ratio of TA to IA is at least 80:20 to about 95:5 and wherein said diamines comprise hexamethylene diamine (HMDA) and trimethylhexamethylene diamine (TMHMDA) in a molar ratio HMDA:TMHMDA of about 98:2 to about 60:40, and (2) about 20 to about 50 parts by weight of a filler selected from the group consisting of glass fibers, graphite fibers, and mixtures thereof.

7. A molded article comprising the filled polyamide resin of claim 4.

8. A crystalline injection moldable polyamide copolymer of terephthalic acid and isophthalic acid and an aliphatic diamines, which copolymer has a heat deflection temperature of at least about 240° C. when molded and filled with glass fibers, glass beads or graphite fibers, comprising the following recurring structural units:

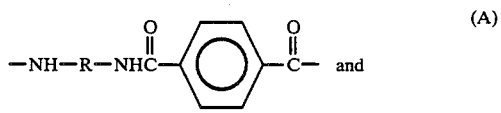

(A)

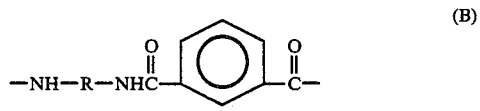

(B)

wherein the mole ratio of A units to B units is between about 81/19 to about 99/1 and R is a straight chain aliphatic hydrocarbon radical comprising 6 carbon atoms and a trimethyl-substituted saturated hydrocarbon radical 6 carbon atoms in length with two of three methyl groups on the same carbon atom wherein the mole ratio of the straight chain hydrocarbon to the trimethyl substituted hydrocarbon is about 55/45 to about 98/2.

* * * * *